(12) United States Patent
Williams

(10) Patent No.: US 9,232,698 B1
(45) Date of Patent: Jan. 12, 2016

(54) EDGING DEVICE

(71) Applicant: Deidra Williams, Westerville, OH (US)

(72) Inventor: Deidra Williams, Westerville, OH (US)

( * ) Notice: Subject to any disclaimer, the term of this patent is extended or adjusted under 35 U.S.C. 154(b) by 0 days.

(21) Appl. No.: 14/512,646

(22) Filed: Oct. 13, 2014

Related U.S. Application Data

(60) Provisional application No. 61/889,904, filed on Oct. 11, 2013.

(51) Int. Cl.
*A01G 1/08* (2006.01)
*E01C 11/22* (2006.01)

(52) U.S. Cl.
CPC ............... *A01G 1/08* (2013.01); *E01C 11/221* (2013.01)

(58) Field of Classification Search
CPC .......... A01G 1/08; E04H 4/141; E01C 4/221; E01C 4/222
USPC .................. 52/102; 47/32, 32.7, 33; 404/8–9
See application file for complete search history.

(56) References Cited

U.S. PATENT DOCUMENTS

| | | | | |
|---|---|---|---|---|
| 3,520,082 | A * | 7/1970 | Smith | 47/33 |
| 3,676,952 | A * | 7/1972 | Watts | 47/33 |
| 3,872,195 | A * | 3/1975 | Stegmeier | 264/35 |
| 4,074,479 | A | 2/1978 | Krupka | |
| 4,601,140 | A | 7/1986 | Russo | |
| 4,809,459 | A * | 3/1989 | Brylla et al. | 47/33 |
| 4,824,068 | A * | 4/1989 | Ferland | 249/2 |
| 4,976,063 | A | 12/1990 | Young | |
| 5,027,551 | A | 7/1991 | Rodriguez | |
| 5,048,241 | A * | 9/1991 | Gavin, Jr. | 52/102 |
| 5,067,273 | A | 11/1991 | Richwine | |
| 5,212,917 | A * | 5/1993 | Kurtz et al. | 52/102 |
| D336,220 | S * | 6/1993 | Grimes | D8/1 |
| 5,240,343 | A * | 8/1993 | Strobl, Jr. | 404/7 |
| D339,199 | S * | 9/1993 | Rynberk | D25/164 |
| 5,301,461 | A * | 4/1994 | Zwier | 47/33 |
| 5,315,780 | A | 5/1994 | Thomas | |
| 5,379,546 | A * | 1/1995 | Popp | 47/33 |
| 5,421,118 | A * | 6/1995 | Bauer | 47/33 |
| 5,456,045 | A | 10/1995 | Bradley et al. | |
| D372,547 | S * | 8/1996 | Sjodin | D25/164 |
| 5,544,445 | A * | 8/1996 | Mantilla | 47/33 |
| D378,857 | S * | 4/1997 | Hale | D25/164 |
| 5,640,801 | A * | 6/1997 | Rynberk | 47/33 |
| 5,755,383 | A * | 5/1998 | Joseph | 239/276 |
| 5,826,372 | A | 10/1998 | Parsons | |
| 5,857,288 | A * | 1/1999 | Wiste | 47/33 |
| 5,956,892 | A * | 9/1999 | Kownacki et al. | 47/33 |
| 6,021,600 | A * | 2/2000 | Everett | 47/33 |
| 6,026,610 | A | 2/2000 | Northrop et al. | |
| 6,085,458 | A * | 7/2000 | Gau | 47/33 |
| 6,379,078 | B1 * | 4/2002 | Zwier | 404/7 |

(Continued)

*Primary Examiner* — Elizabeth A Plummer
*Assistant Examiner* — Kyle Walraed-Sullivan
(74) *Attorney, Agent, or Firm* — Standley Law Group LLP

(57) ABSTRACT

A lawn edging device having overlapping, alternating toe plates forming a base portion that covers a strip of soil. The toe plates are connected at proximal edges to a resilient, elongate backing strip, from which a plurality of ground insertion spikes depend downwardly. The device is may also be provided with a vertical edge-defining portion extending upwardly from the backing strip. Flexing or trimming notches of material being horizontal or vertical are made in the back or front surfaces of the backing strip or edge-defining portion providing changeable device dimensions and increasing flexion of the device for making custom lawn edging curves and angles without decreasing device strength.

19 Claims, 6 Drawing Sheets

(56) References Cited

U.S. PATENT DOCUMENTS

| | | |
|---|---|---|
| 6,385,898 B1 | 5/2002 | Noel |
| 6,502,349 B1 * | 1/2003 | Richet et al. ............... 47/33 |
| 6,568,126 B2 * | 5/2003 | Womack ............... 47/33 |
| 6,588,979 B1 * | 7/2003 | Pasij ............... 405/114 |
| 6,594,959 B2 | 7/2003 | Whitson |
| 6,779,297 B2 | 8/2004 | Conde |
| 7,051,477 B2 | 5/2006 | Burnham |
| 7,546,713 B2 * | 6/2009 | Bradley ............... 52/246 |
| D612,072 S | 3/2010 | Keeley |
| 7,669,365 B2 | 3/2010 | Olink |
| 7,774,993 B2 * | 8/2010 | Strobl et al. ............... 52/102 |
| 7,810,277 B2 | 10/2010 | Fakhari |
| 7,963,718 B2 * | 6/2011 | Zwier et al. ............... 404/7 |
| 8,354,048 B2 | 1/2013 | Caceres et al. |
| 2008/0163566 A1 * | 7/2008 | Bella ............... 52/102 |
| 2011/0277395 A1 * | 11/2011 | Wink ............... 52/102 |
| 2014/0041293 A1 * | 2/2014 | Kellogg ............... 47/33 |

* cited by examiner

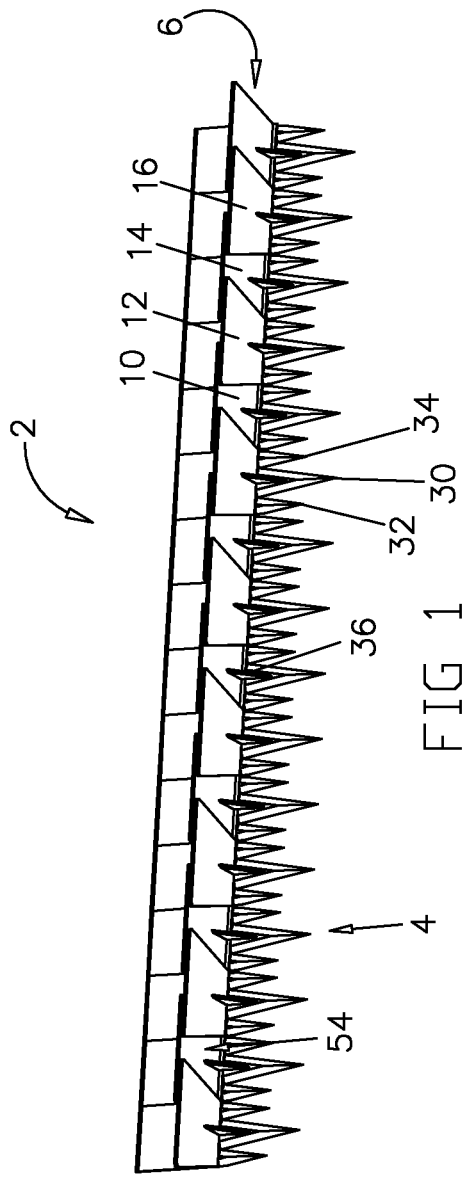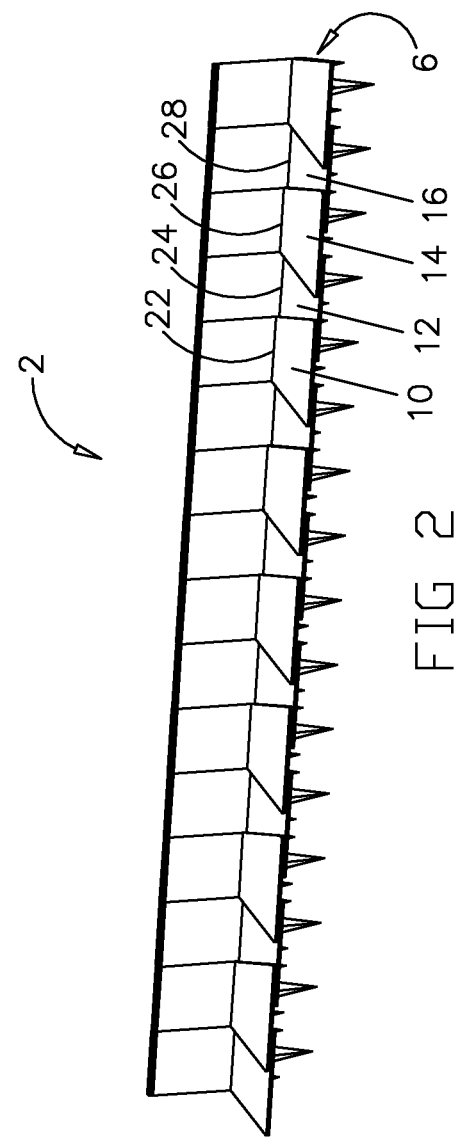

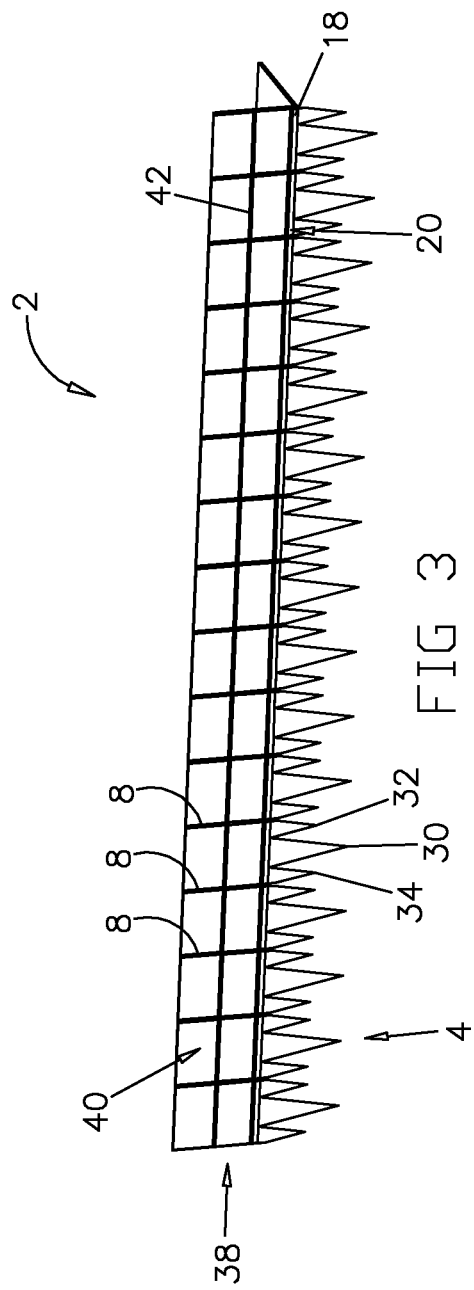
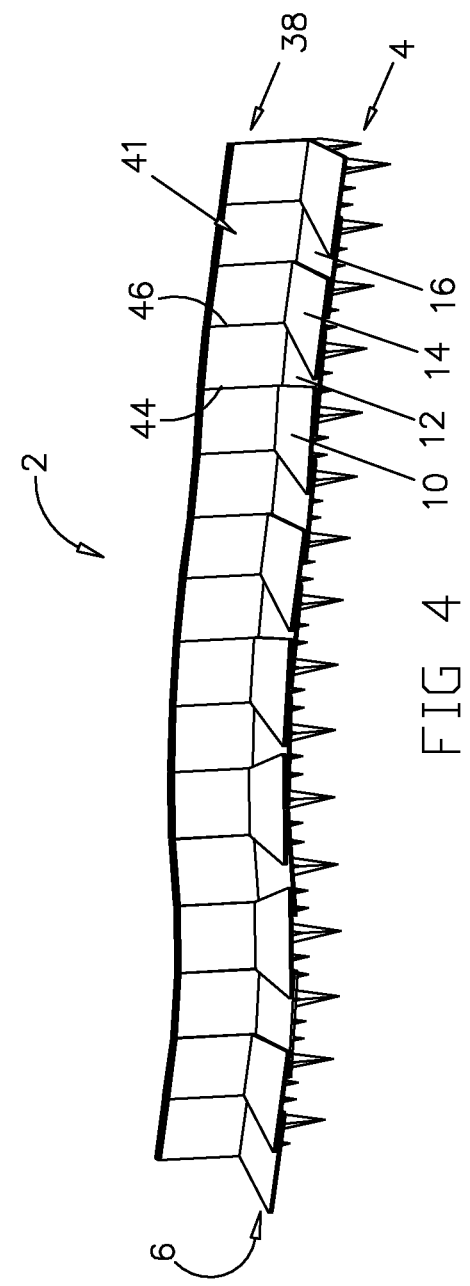

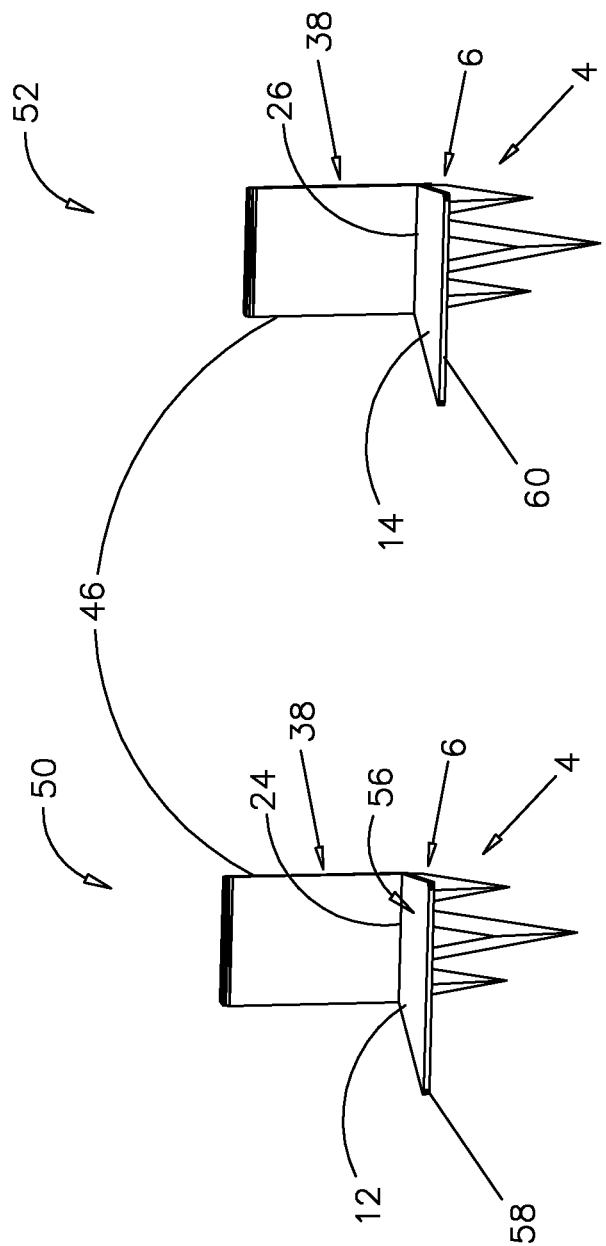

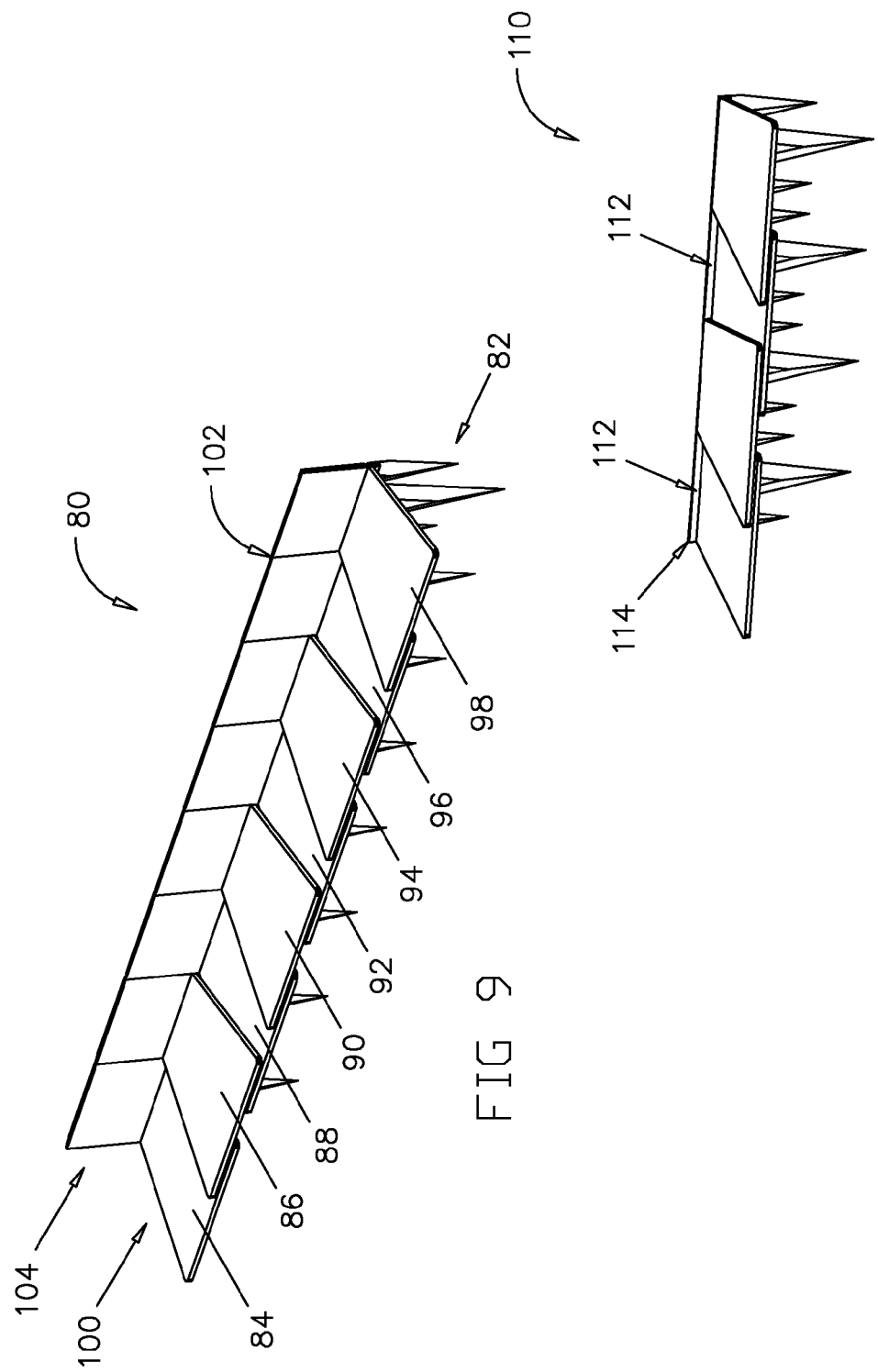

EDGING DEVICE

CROSS-REFERENCE TO RELATED APPLICATIONS

This application claims priority to U.S. Provisional Application No. 61/889,904 filed 11 Oct. 2013, the content of which is hereby incorporated by reference as if fully recited herein.

TECHNICAL FIELD

The present invention is in the technical field of landscaping. More particularly, the present invention is in the technical field of lawn edging devices.

BACKGROUND OF THE INVENTION

It is often desirable to provide neat, uniform edges to various beds, walkways, foundations, water features and other such landscaping elements of manicured lawns, gardens and the like. In the past, various apparatuses have been used to assist in defining such edges, to prevent soil and groundcover creep, erosion, and loss of edge definition, and to make it easier to maintain a groomed outdoor space.

Several common designs exist in the prior art offering a robust barrier to soil and groundcover movement by way of rigid strips of various configurations. While these devices provide sufficient strength, they often lack the ability to easily create smooth, curved edging, or require curved sections to be preformed to the specifications of the landscape design prior to installation. These types of edging devices are often constructed of rigid metals, alloys or plastics.

Yet other proposed prior art solutions have attempted to solve these problems by teaching the application of edging devices made of extruded, pliable material so that desired curved edges may be formed, and in order to allow the devices to be packaged in coiled, space-saving configurations. These types of edging device are commonly constructed as elongated, generally rectangular shaped extrusions. These devices, however, often lack the strength necessary to maintain edge lines for extended periods of time.

The aforementioned edging devices also lack the ability to provide space between groundcover and the landscaping element being edged. Such functionality is desired, for instance, when edging is installed against foundations in order to cover the soil in the area of curtilage immediately surrounding the structure which may be inaccessible to lawn mowers. Attempts in the prior art to overcome such deficiencies have included the addition of a horizontal base portion to cover such widths of soil, but do not provide users with the ability to easily form any desired sharp angle or curve without resorting to the purchase or creation of multiple sections of various geometries in order to achieve a desired edging line. Some devices—such as those intended for use as paver restraint edging or foundational edging—may be usable for straight sections and gradual curves, but cannot also provide sharp angles or curves that may be desired by a user.

Furthermore, no devices available today enable a user to apply pre-manufactured edging that provides aesthetically pleasing visual elements while maintaining a user's ability to create fully customized edge lines without the need to purchase and integrate various preformed edge elements, such as curves of various radii, straight sections, sharp angles and the like.

It is therefore an unmet need in the prior art for a lawn edging device that provides, in a single embodiment, the ability to form any geometric edging shape/line while providing strength, horizontal soil covering, aesthetic elements, adjustable height and length, and that may be used against permanent or semi-permanent structures such as buildings, walkways or other masonry, or around beds, gardens or other non-structural features alike.

BRIEF SUMMARY OF THE INVENTION

The present invention is a lawn edging device capable of a wide spectrum of curve radiuses and hard angles for users to use as edging and to prevent grass, weed and other groundcover growth thereby creating a lasting non-trimming situation.

Exemplary embodiments of the lawn edging device are provided with resilient, elongate, vertical backing strips having a length, a back surface and a front surface. The front surface has an upper portion and a lower portion. The device has further a horizontal base portion having an upper toe plate row and a lower toe plate row. The upper and lower toe plates rows have, respectively, pluralities of upper and lower toe plates spaced apart by a plurality of upper and lower spaces along the length of the backing strip. Each of the upper and lower toe plates extend outwardly from its proximal edge from a portion of the front surface of the backing strip occupied by the row corresponding to that plate. The device is further provided with a plurality of ground insertion spikes depending downwardly from the backing strip.

An object of the present invention is provide staggered upper and lower rows whereby the spaces of each row are horizontally aligned with the toe plates of the remaining row.

The invention is further provided wherein each upper and lower toe plate comprises a flat bottom and flat top surface, respectively. Each pair of adjacent upper and lower toe plates may overlap to form a plain bearing between the bottom surface of the upper toe plate and the top surface of the lower toe plate.

A further object of the invention is to provide complete soil cover beneath the base portion wherein each pair of adjacent toe plates are provided with abutting proximal edge ends that are coterminous at a vertical line.

Another aspect of the invention is to provide a vertical edge-defining portion extending upwardly from the backing strip.

Another aspect of the invention is a vertical flexing notch spanning the back surface of the backing strip or edge-defining portion at a lengthwise position corresponding to each coterminous pair of proximal edge ends.

Additional features of the invention include the use of upper and lower toe plates in the shape of an isosceles trapezoid each having its short base side correspond to the proximal edge of the toe plate.

The invented device is preferably constructed of a single molded plastic unit.

These and other advantages are provided by the invention described and shown in more detail below.

BRIEF DESCRIPTION OF THE SEVERAL VIEWS OF THE DRAWINGS

Novel features and advantages of the present invention, in addition to those mentioned above, will become apparent to those skilled in the art from a reading of the following detailed description in conjunction with the accompanying drawings wherein identical reference characters refer to identical parts and in which:

FIG. 1 is a first perspective view of a first exemplary embodiment of the invention;

FIG. 2 is a second perspective view of the embodiment shown in FIG. 1;

FIG. 3 is a third perspective view of the embodiment shown in FIG. 1;

FIG. 4 is a fourth perspective view of the embodiment shown in FIG. 1 in an exemplary curved configuration;

FIG. 5 is a perspective view of a lower toe plate element of the embodiment shown in FIG. 1;

FIG. 6 is a perspective view of an upper toe plate element of the embodiment shown in FIG. 1;

FIG. 9 is a perspective view of a second exemplary embodiment of the invention;

FIG. 10 is a perspective view of a third exemplary embodiment of the invention;

DETAILED DESCRIPTION OF THE INVENTION

Figure 8:
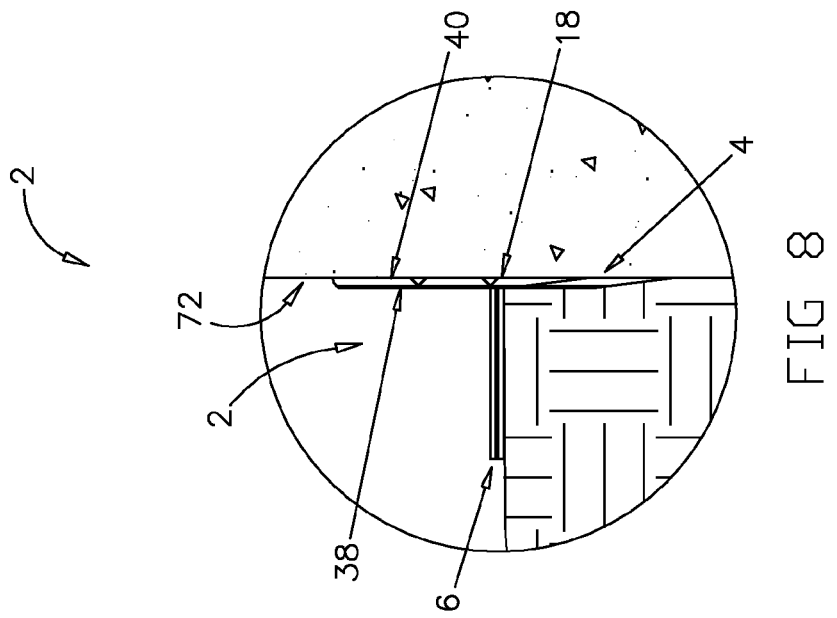
FIG. 8 is a detailed view of section A-A of FIG. 7.

Referring now to the invention in more detail, FIGS. 1-3 depict several views of an exemplary embodiment of an edging device 2 having a sideways "T" shape, a spiked edge 4 to assist insertion into the ground, overlapping toe plates (e.g., 10, 12, 14 and 16) configured as a horizontal base portion 6, and notches 8 to aid in flexing or trimming. The device is shown having a backing strip 18 (see FIGS. 3, 5, 6 and 10 for further detail) of any practicable length that is desired for unitary manufacture and sale. For example, the embodiment as shown in FIGS. 1-4 is depicted as a device 2 having a preferable length of four feet as being ideal for storage and transport, although other desired lengths may be applied.

The backing strip 18 is preferably formed of an elongate, generally rectangular section of resilient material. Resilient plastics are preferred—particularly those having a higher resistance to bending than those commonly used in the prior art. It is considered preferable for embodiments of the invention to be manufactured from high-density polyethylene (HDPE) or a similar material with the properties and characteristics of moisture resistance and chemical resistance, is flame retardant and machinable, and has a high impact strength. As will be explained in further detail below, the invention permits the use of stronger materials in its construction relative to the prior art due to the increased flexibility of the device that results from the configuration of the structural elements. This provides a device that maintains the integrity of edge lines as originally created for longer periods of time, and resists the potential for damage to the device itself caused by inadvertent contact from people, animals, lawn care machines and the like.

Referring again to FIGS. 1-4, FIG. 1 is a view of the device 2 from a lowered, front perspective, FIG. 2 is a view of the device 2 from a raised, front perspective, and FIG. 3 is a view of the device 2 from a raised, rear perspective. FIG. 4 is a raised, front perspective view of the device 2 in an exemplary curved position.

The backing strip 18 is, when the device 2 is in a generally upright or level position, vertically oriented, having front (see, e.g., 112 at FIG. 10) and back 20 surfaces. Extending forwardly from the front surface of the backing strip 18 and along its length (left-to-right) are an alternating series of upper (e.g., 10 and 14) and lower (e.g., 12 and 16) toe plates. The upper and lower toe plates are spaced apart in an upper and lower row, respectively, wherein traversing the length of the device 2 along the front surface of the backing strip 18 will yield an alternating sequence of upper and lower proximal edges (e.g., 22, 24, 26 and 28), which form the attachment point with the front surface of the backing strip.

FIGS. 1-4 show, for instance, an upper row having eight upper toe plates and a lower row having eight lower toe plates. While the rows need not always carry an identical number of toe plates, they should be spaced apart and offset so that they each carry a number of toe plates that is within one of number of toe plates carried by the remaining row. For example, given that an upper row has eight upper toe plates, the lower row should be configured with either seven or nine lower toe plates.

While the device may be manufactured with horizontal space between any two adjacent upper and lower toe plate proximal edges (e.g., 12 and 14), it is preferable—for the purposes of increased structural strength and to provide complete soil coverage by the base portion 6—for the upper toe plates to be spaced apart at a width equal to the length of the lower toe plate proximal edge. Likewise, it is preferable for the lower toe plates to be spaced apart at a width equal to the length of the lower toe plate proximal edge. Importantly, while toe plates in either row may vary in the length of their proximal edge, for example in a linearly repeating pattern, it is preferable for the space between any two consecutive upper toe plates (e.g., 10 and 14) to be equal or approximately equal to the length of the proximal edge of the lower toe plate adjacent to both upper toe plates (e.g., 12). Those skilled in the art will appreciate that the invention provides such repeating patterns that—when combined with aesthetic elements described below—will allow those manufacturing the device to produce natural-looking devices providing the features of the present invention at a lower cost than prior art natural edging devices.

Also depicted in the embodiment shown in FIGS. 1-4 is a plurality of ground insertion spikes 4 depending downwardly from the backing strip 18. The insertion spikes 4 ease the insertion of the device into the ground during installation and provide anchoring forces so that the device 2 is retained within the ground until a user desires that it be removed. In general, while any known or comparable configuration of insertion spikes 4 depending downwardly from the backing strip 18 is sufficient to make and use the present invention, the particular configuration shown in these figures is preferable. It is preferable to provide at least one primary insertion spike (e.g., 30) corresponding to each toe plate (e.g., 10) on the device 2 and depending downwardly from the backing strip 18 at a length-wise position centered (symmetrically for multiple primary spikes) with the proximal edge (e.g., 22) of the toe plate. Secondary insertion spikes (e.g., 32 and 34) may be optionally provided between adjacent primary spikes, and strengthening members such as a bracket, brace, chamfer or fillet (e.g., 36) optionally included between an insertion spike and a toe plate. When a custom edging curve is desired, such as that depicted in connection with FIG. 4, the preferable use of these optional elements operates to increase the resistance of individual toe plate sections to movement relative to adjacent toe plate sections, thereby preserving the desired curve geometry after installation.

Another aspect of the invention is provided in an optional edge-defining portion 38 extending upwardly from the backing strip 18. The edge-defining portion 38 is substantially vertical and may be manufactured at various heights as desired. In the preferred embodiment, one height of four inches is manufactured, with the notches allowing flexing or trimming to two inches or zero inches or flush. The back surface 40 of the edge-defining portion is preferably substantially flat in order to be seated flush against foundations, walls, walkways and other such flat surfaces. As the base portion 6 generally rests at or near ground level when installed, the height of the edge-defining portion will be the height above ground level desired for a particular application. Further, one or more optional horizontal trimming notches 42 spanning the back surface 40 of the edge-defining portion 38 are provided wherein the notches permit easy trimming of the edge-defining portion to achieve a smaller height where needed via a thinner material thickness along the notch. The edge-defining portion 38 and the backing strip 18 perform the functions described herein, and may by separate elements, or structurally combined, via molding for instance.

Yet another aspect of the invention includes increased flexion at the ends of toe plate proximal edges. Higher strength materials may be used to construct the present invention to prolong the life of the device and increase its effectiveness at preventing soil erosion and groundcover encroachment and maintaining desired edging lines, while presenting the disadvantage of decreasing the amount of flexion beyond what is necessary to create some short radius curves or sharp angles. To provide for a stronger device without unnecessarily limiting the ability of the device to be bend, optional flexing notches 8 are used. The flexing notches 8 are vertical material voids that occur on the surface of the backing strip 18 and if applicable the edge-defining portion 38, and preferably the back surfaces 20 and 40, resulting in thinner material at those points. Providing flexing notches at each lateral end of the proximal edge of a toe plate will increase the flexion of the toe plate section with respect to adjacent sections. Preferably, the abutting lateral ends of the proximal edges of adjacent toe plates—being coterminous at a vertical line—coincide with a flexing notch, as at 8 in FIGS. 1-4. Flexing notches may also serve the dual purpose of allowing a user to more easily trim a full length device to a shorter length at the end of a line or shape, for instance.

Turning specifically to FIG. 4, further principles of the present invention are illustrated, and in which curves of various sizes and lengths are depicted for the edging device 2. The curves are made at its flexing notches, which in this embodiment are provided at the abutting edges of adjacent toe plates. The figure shows the locations of the notches showing through from the back surfaces at, for example, lines 44 and 46. The notch behind line 44 permits increased flexion between the toe plate sections for toe plates 10 and 12, and the notch behind line 46 permits increased flexion between the toe plate sections for toe plates 12 and 14. For example, a forwardly concave curve is created by flexing the toe plate sections for toe plates 10 and 14 forwardly with respect to the toe plate section for toe plate 12, wherein the toe plates 10 and 14 cover additional portions of the top surface of toe plate 12 with respect to their positions when the device 2 is not curved. In general, a flexing notch may be employed on—in addition to the back surface 20 of the backing strip 18—either or both of the front 41 and back 40 surfaces of the edge defining portion 38, and may be included, for instance, as a mold cavity feature, later cut by a V-groove or other such routing method, or other such comparable manufacturing processes.

FIGS. 5 and 6 depict toe plate sections, 50 and 52 respectively, for lower 12 and upper 14 toe plates of the embodiment shown in connection with FIGS. 1-4. In order to achieve a sufficiently complete covering of the soil beneath the base portion 6 of the device, it is preferable for the interior ends of adjacent toe plates to be vertically aligned, as illustrated by the vertical line 46 shared by adjacent toe plate sections 50 and 52. Their proximal edges 24 and 26 for instance, have abutting ends that are coterminous at line 46.

To further achieve the objective of providing complete soil coverage by the base portion 6 while simultaneously providing the ability to install the invented device to achieve desired custom curves, angles and edges, it is also preferable for the device to be provided with overlapping adjacent toe plates. For example, each upper toe plate is optionally constructed with at least a flat bottom surface (e.g., 54 in FIG. 1), and each lower toe plate is optionally constructed with at least a flat top surface (e.g., 56 in FIG. 5). The toe plates generally have fixed proximal edges (e.g., 24 and 26) and free outer edges (e.g., 58 and 60) that terminate at the extreme (i.e., left and right) ends of the proximal edge to form a toe plate perimeter, which in turn defines a toe plate shape. Preferably, the shape has length-wise portions that are wider than the proximal edge, in order to achieve the overlapping situation described above. Preferably, the toe plate shape is an isosceles non-rectangle trapezoid, wherein the short base corresponds to the fixed proximal edge. Preferable embodiments include interior trapezoid angles of 104 degrees and 76 degrees. A range of ±5-25 degrees from 90 is considered preferable in order to maintain a plain bearing relationship between adjacent toe plates during installation for the toe plate sizes shown for the exemplary embodiments (e.g., four inches in FIGS. 5 and 6 for toe plates with a proximal edge length of three inches), while providing the greatest degree of movement and curve customization.

Figure 11:
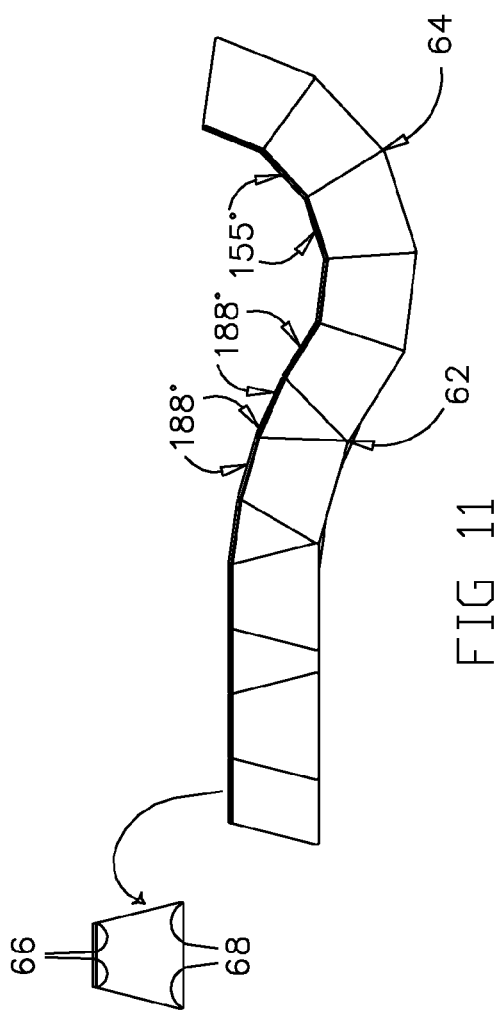
FIG. 11 is a plan view of a fourth exemplary embodiment of the invention in a further exemplary curved configuration.

FIG. 11 depicts a plan view of a further exemplary embodiment and configuration wherein the toe plates are configured as isosceles trapezoids with interior angles of 104° 66 and 76° 68. An exemplary custom curve is shown in which concave curves having 172° bends between adjacent proximal edges may be achieved before adjacent upper, or adjacent lower toe plates contact one another (e.g., as at 62). Likewise, convex curves of 205° may be achieved without creating any gaps between the toe plates (e.g., as at 64). Those skilled in the art will appreciate that the particular selection of toe plate shape and size will be determinative of such curve characteristics, and such selections are within the ability of the skilled artisan.

Figure 7:
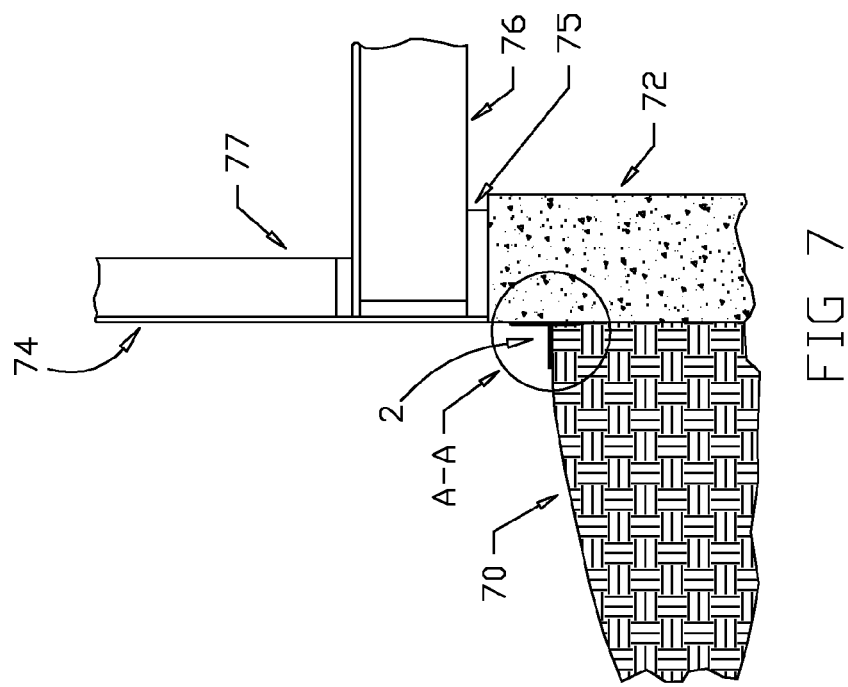
FIG. 7 is a sectional view of the embodiment shown in FIG. 1 in use against a foundation.

The embodiment shown in connection with FIGS. 1-4 has the advantage of permitting the base portion 6 to entirely cover a width of soil to provide clearance near structures, for instance, in the immediate curtilage area of the grade 70 (e.g., shown as four inches in FIG. 2). FIGS. 7 and 8 are additional views of that embodiment installed against the foundation wall 72 of a structure 74. In FIG. 7, an exemplary sill plate 75, floor joist 76 and wall stud 77 is depicted to show optional positioning of the invented device 2. FIG. 8 shows a detailed view of area A-A in FIG. 7, wherein the base portion 6, spike edge 4, backing strip 18, and rear surface 40 of the edge-defining portion 38 of the device 2 are shown in greater detail. By way of additional example, the device 2 may be turned inwardly toward a landscaping feature, wherein the base portion 6 sits beneath decorative masonry or garden soil, providing a defined edge directly against the groundcover. The invention thus provides a well-defined edge having customizable curvature, with the option of either providing or not providing a groundcover clearance area around a landscaping feature, walkway, structure or other such elements of an outdoor space.

Referring now to FIG. 9, an further exemplary embodiment of the invented apparatus 80 having a sideways "T" shape is depicted having a spiked edge 82 to assist insertion into the ground, eight overlapping toe plates 84, 86, 88, 90, 92, 94, 96 and 98 configured as a substantially horizontal base portion 100, and notches (e.g., 102) to aid in flexing or trimming. Note that only one horizontal notch is provided in this particular embodiment, similar to the lower horizontal notch shown just above the backing strip 18 in the embodiment depicted in FIG. 8. This embodiment is depicted as a device 80 having a preferable length of two feet as being ideal for storage and transport, although other desired lengths may be applied. A shorter edge-defining portion 104 is thus provided in this embodiment.

Note also that the embodiment shown in FIG. 9 also shows a lower row of toe plates consisting of toe plates 84, 88, 92 and 96, and an upper row of toe plates consisting of toe plates 86, 90, 94 and 98.

FIG. 10 depicts yet another exemplary embodiment of the invention in which the device 110 is configured without an edge-defining portion. FIG. 10 also provides a further detailed view of portions of the front surface 112 of a backing strip 114, shown in the spaces between the spaced apart upper toe plates. Corresponding portions of the front surface appear beneath the upper toe plates in the spaces between the spaced apart lower toe plates. Referring momentarily back to FIGS. 5 and 6, note that the difference in total height between the portions 50 and 52 (4" and 3$^{13}/_{16}$" respectively) is due to the portion of the front surface of the backing strip being included in the measurements; the height of the edge-defining portion remains equal between the two portions according to the use of the terminology herein.

The advantages of the present invention include, without limitation, the ability to flex an edging device to suit the user's needs. The present invention also has the ability to create a non-trimming situation for the user, or conversely the ability to be various heights being trimmed at the notches to suit the user or manufactured to predetermined dimensions. The present invention may be offered in multiple different lengths with the ability to be cut to any desired length at or not at the notches to suit the user. In broad embodiment, the present invention is a plastic device that is flexible used for edging.

Figure 12:
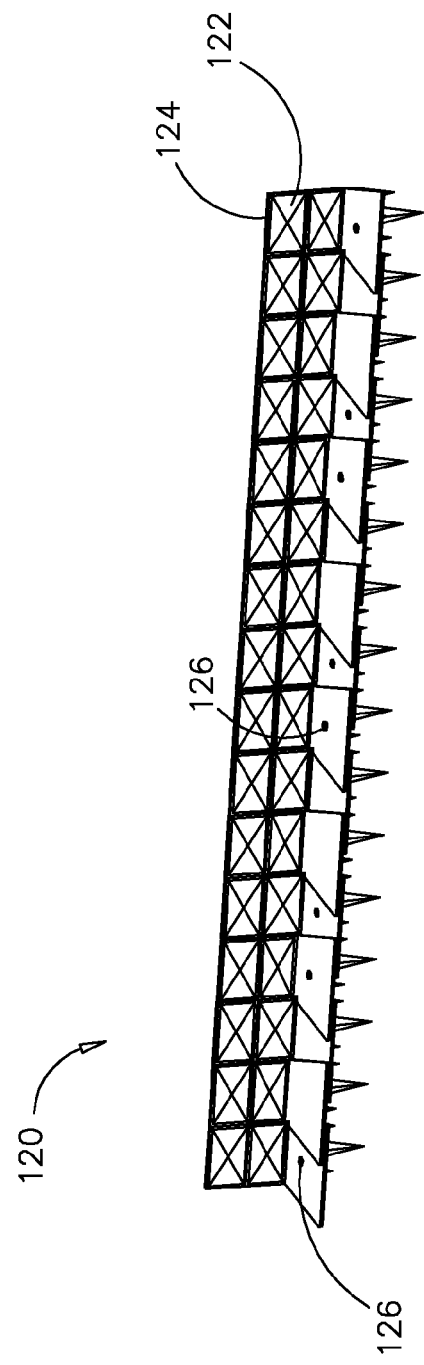
FIG. 12 is a perspective view of a fifth exemplary embodiment of the invention.

Furthermore, any of the exemplary embodiments or other applications of the invention may be additionally provided with aesthetic features to create a highly customizable edging device that appears "natural" while including all of the features of the invention. For example, three-dimensional artificial rocks of varying sizes and shapes may be integrated or attached to the top surfaces of the upper toe plates. Repeating patterns of "random" rocks or other such features may be used to increase the manufacturability of the device as needed. An additional exemplary embodiment of the invention 120 is shown in front perspective view in FIG. 12 illustrating this feature. In this embodiment, the edge-defining portion is configured to resemble a brick pattern, wherein the preferably textured front surface is divided into a series of red colored rectangular sections 122 divided by gray colored edges 124. Patterns and the like may also similarly be provided on the back surface of the edge-defining portion. Those skilled in the art will appreciate that a great variety of textures, patterns and colors may be applied to the edge-defining portion according to the requirements of a particular application.

FIG. 12 further illustrates an additional feature of the invention wherein the embodiment is provided with an optional plurality of recesses or anchor apertures 126. In some embodiments such as the one depicted, all or a portion of the toe plates may include a recess portion 126 of thinner thickness relative to the toe plate thickness wherein it is able to be punctured with a sharp anchor or hold-down fastener (not shown) such as a long nail-shaped or serrated object. The recess 126 may further be configured as an aperture therein for receiving a ground anchor. The inclusion of a recess such as 126 has been found to increase the stability of the invented device and prevent undesired movement once installed.

Any embodiment of the present invention may include any of the optional or preferred features of the other embodiments of the present invention. The exemplary embodiments herein disclosed are not intended to be exhaustive or to unnecessarily limit the scope of the invention. The exemplary embodiments were chosen and described in order to explain some of the principles of the present invention so that others skilled in the art may practice the invention. Having shown and described exemplary embodiments of the present invention, those skilled in the art will realize that many variations and modifications may be made to the described invention. Many of those variations and modifications will provide the same result and fall within the spirit of the claimed invention. It is the intention, therefore, to limit the invention only as indicated by the scope of the claims.

What is claimed is:

1. A lawn edging apparatus comprising:
 a resilient, elongate, vertical, unitary backing strip comprising:
  a length;
  a back surface; and
  a front surface having an upper portion and a lower portion;
 a horizontal base portion comprising:
  an upper toe plate row comprised of a plurality of upper toe plates spaced apart by a plurality of upper spaces along the length of the backing strip, and wherein each upper toe plate extends outwardly at a proximal edge from the upper portion of the front surface of the backing strip; and
  a lower toe plate row comprised of a plurality of lower toe plates spaced apart by a plurality of lower spaces along the length of the backing strip, and wherein each lower toe plate extends outwardly at a proximal edge from the lower portion of the front surface of the backing strip; and
 a plurality of ground insertion spikes depending downwardly from the backing strip,
 wherein the upper toe plate row and the lower toe plate row are staggered whereby each upper toe plate in the plurality of upper toe plates is horizontally aligned with a lower space in the plurality of lower spaces and each lower toe plate in the plurality of lower toe plates is horizontally aligned with an upper space in the plurality of upper spaces,
 wherein each upper toe plate in the plurality of upper toe plates further comprises a flat bottom surface and each lower toe plate in the plurality of lower toe plates further comprises a flat top surface, and whereby a pair of adjacent upper and lower toe plates is defined by each upper toe plate and an adjacent lower toe plate that overlap to form a plain bearing between the bottom surface of the upper toe plate and the top surface of the adjacent lower toe plate, and
 wherein for each pair of adjacent upper and lower toe plates, an end of the proximal edge of the upper toe plate is coterminous at a vertical line with an end of the proximal edge of the lower toe plate, thereby defining a coterminous pair of proximal edge ends.

2. The lawn edging apparatus of claim 1, further comprising a vertical flexing notch spanning the back surface of the backing strip at a lengthwise position of the backing strip corresponding to each coterminous pair of proximal edge ends.

3. The lawn edging apparatus of claim 2, wherein each upper toe plate in the plurality of upper toe plates and each lower toe plate in the plurality of lower toe plates is shaped as an isosceles trapezoid having a short base side corresponding to the proximal edge of the toe plate.

4. The lawn edging apparatus of claim 3, wherein the backing strip, the horizontal base portion and the plurality of ground insertion spikes comprise a single molded plastic unit.

5. The lawn edging apparatus of claim 1, further comprising an edge-defining portion extending upwardly from the backing strip.

6. The lawn edging apparatus of claim 5, wherein the edge-defining portion further comprises a back surface, and wherein the back surface of the backing strip and the back surface of the edge-defining portion are coplanar, and wherein for each pair of adjacent upper and lower toe plates, an end of the proximal edge of the upper toe plate is coterminous at a vertical line with an end of the proximal edge of the lower toe plate, thereby defining a coterminous pair of proximal edge ends.

7. The lawn edging apparatus of claim 6, further comprising a vertical flexing notch spanning the back surface of the backing strip and the back surface of the edge-defining portion at a lengthwise position of the backing strip corresponding to each coterminous pair of proximal edge ends.

8. The lawn edging apparatus of claim 7, further comprising a horizontal trimming notch spanning the back surface of the edge-defining portion.

9. The lawn edging apparatus of claim 8, wherein each upper toe plate in the plurality of upper toe plates and each lower toe plate in the plurality of lower toe plates is shaped as an isosceles trapezoid having a short base side corresponding to the proximal edge of the toe plate.

10. The lawn edging apparatus of claim 9, wherein the backing strip, the horizontal base portion and the plurality of ground insertion spikes comprise a single molded plastic unit.

11. A lawn edging apparatus comprising:
a resilient, elongate, vertical, unitary backing strip having a length and comprising:
   a back surface; and
   a front surface having an upper portion and a lower portion;
a plurality of horizontal, flat toe plates each comprising:
   a fixed proximal edge having a left end and a right end and a centerline;
   a free outer edge terminating at the left and right ends of the proximal edge, whereby the proximal edge and the outer edge together form a toe plate perimeter;
   a top surface;
   a bottom surface; and
   a shape defined by the toe plate perimeter,
   wherein the plurality of toe plates are fixed continuously end-to-end at the proximal edge along the length of the backing strip to the front surface of the backing strip in alternating fashion between the upper and lower portions of the front surface, whereby adjacent proximal edge ends are coterminous at a vertical line thereby defining a coterminous pair of adjacent proximal edge ends, and
   whereby adjacent toe plates overlap to form a plain bearing between the bottom surface of the toe plate fixed to the upper portion of the front surface of the backing strip and the top surface of the toe plate fixed to the lower portion of the front surface of the backing strip; and
a plurality of spaced apart primary ground insertion spikes depending downwardly from the backing strip.

12. The lawn edging apparatus of claim 11, further comprising one or more secondary ground insertion spikes depending downwardly from the backing strip between each adjacent primary ground insertion spike in the plurality of spaced apart primary ground insertion spikes.

13. The lawn edging apparatus of claim 11, further comprising an edge-defining portion extending upwardly from the backing strip and having a back surface, and wherein the back surface of the backing strip and the back surface of the edge-defining portion are coplanar.

14. The lawn edging apparatus of claim 13, further comprising a vertical flexing notch spanning the back surface of the backing strip and the back surface of the edge-defining portion at a lengthwise position of the backing strip corresponding to each coterminous pair of adjacent proximal edge ends.

15. The lawn edging apparatus of claim 14, further comprising a horizontal trimming notch spanning the back surface of the edge-defining portion.

16. The lawn edging apparatus of claim 15, wherein for each toe plate in the plurality of toe plates, the shape defined by the toe plate perimeter is an isosceles trapezoid having a short base and a long base, wherein the short base is the proximal edge of the toe plate.

17. The lawn edging apparatus of claim 16, wherein the backing strip, the plurality of horizontal, flat toe plates, the plurality of spaced apart primary ground insertion spikes and the edge-defining portion comprise a single molded plastic unit.

18. The lawn edging apparatus of claim 17, wherein the plurality of primary ground insertion spikes further comprises a primary ground insertion spike depending downwardly from the backing strip at a location along the length of the backing strip corresponding to the proximal edge centerline of each toe plate in the plurality of toe plates.

19. The lawn edging apparatus of claim 18, further comprising a supporting bracket connecting each primary ground insertion spike to the bottom surface of a correspondingly located toe plate.

* * * * *